T. WIDLAND.
TAILOR'S ADJUSTABLE MEASURE.
APPLICATION FILED JULY 31, 1915.
1,198,499.
Patented Sept. 19, 1916.
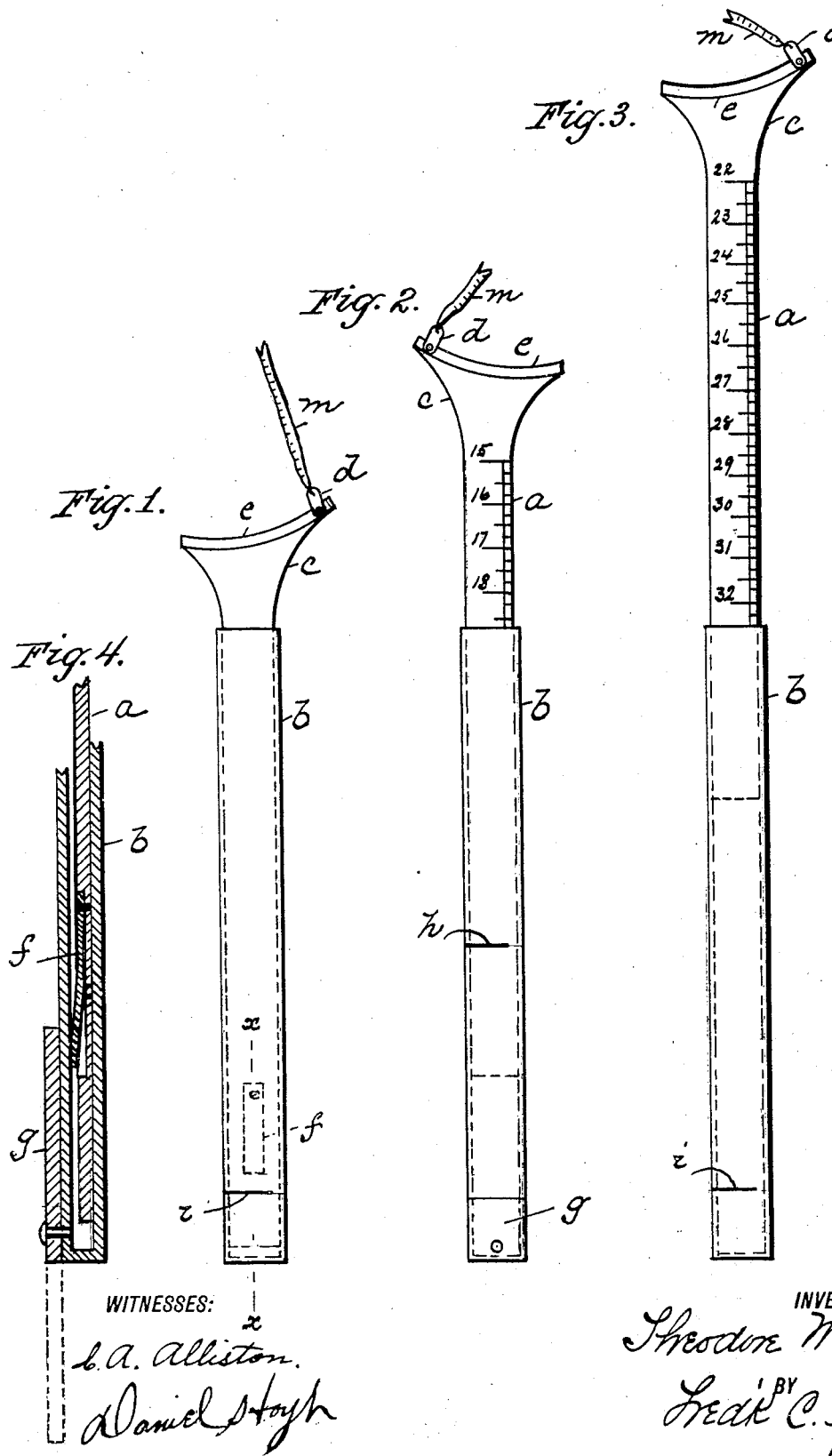

UNITED STATES PATENT OFFICE.

THEODORE WIDLAND, OF ARLINGTON, NEW JERSEY.

TAILOR'S ADJUSTABLE MEASURE.

1,198,499.   Specification of Letters Patent.   Patented Sept. 19, 1916.

Application filed July 31, 1915. Serial No. 43,039.

*To all whom it may concern:*

Be it known that I, THEODORE WIDLAND, a citizen of the United States, residing in the town of Arlington, in the county of Hudson and State of New Jersey, have invented certain new and useful Improvements in Tailors' Adjustable Measures, of which the following is a full, clear, and exact description, such as will enable others skilled in the art to which it pertains to make and use the same, reference being had to the accompanying drawings, and to letters of reference marked thereon, forming a part of this specification.

This invention relates to tailors' adjustable measures, and particularly to a device for obtaining sleeve and trouser-leg measurements.

The object of my invention is the production of a tailor's adjustable measure, which shall be simple in construction, comparatively inexpensive in cost, and efficient in operation.

With this end in view, my invention consists in certain novelties of construction and arrangements of parts, as hereinafter set forth and pointed out in the claims.

While the preferred forms of my invention are illustrated in the accompanying drawings, yet it is to be understood that minor detail changes may be made without departing from the scope thereof.

Throughout the specification and drawings, like reference characters are employed to indicate corresponding parts, and in the drawings, Figure 1 represents a side elevation of my improved device. Fig. 2 represents a similar view, illustrating the device in an extended position, after a measurement of the sleeve has been taken. Fig. 3 represents a similar view, after a measurement of the trouser-leg has been taken; and Fig. 4 represents an enlarged fragmentary sectional view taken on line $x$—$x$ of Fig. 1.

The device consists essentially of two members, namely, the graduated member $a$ and the casing $b$, in which it is slidably arranged. Both of these parts are preferably made of wood, and of a shape as clearly indicated in the cross-sectional view. The graduated member $a$, at its outer and free end, is provided with a curved and concaved enlargement $c$, designed to engage with the under side of the arm to be measured, or between the crotch of the legs, in order to measure the length of the trouser-legs.

The curved enlargement $c$, at its front end, extends upwardly and above the rear end thereof, and is provided with a pivoted link $d$, to which one end of a tape line $m$ is secured, in order to obtain additional measurements from the crotch between the legs to the waist-line, and to further obtain what is known as the "strap measure" from the armpit across the shoulder to the middle of the back. The curved enlargement $c$ is provided with a metallic edge $e$, to provide the necessary rigidity therefor.

One side of the graduated member $a$, namely, the side to be used when the trouser-leg measurement is to be taken, has stamped thereon, graduations ranging from 22 inches to $37\frac{1}{2}$ inches, and the other side, which is to be used when the sleeve measurement is to be taken, has graduations stamped thereon ranging from 15 inches to 24 inches When a measurement is taken, it will be understood that the same is taken from the curved portion $c$ to the sleeve or trouser-length lines, and as the graduated member $a$ is extended, the reading is taken on the member $a$ where it emerges from the casing $b$.

A flat spring $f$ is, in any convenient manner, secured in a suitable recess formed in one side of the graduated member $a$, and so arranged that the free end thereof bears upon and has sliding engagement with the inside of the casing $b$, to provide means whereby the two members are frictionally held together in either a closed or an extended position.

An extension $g$ of the same width as the casing $b$, is pivotally arranged on the outside of the casing and in close proximity to the lower end thereof, and is of a dimension that when swung into the position shown in dotted lines, will extend one and one-half inches below the end of the casing, the object of which will be presently described. The curved sides of the enlargement $c$, as clearly indicated in Fig. 1 of the drawings, limits the inward movement of the member $a$. A line $h$ is stamped on the outside of the casing $b$, which line indicates the starting point of the sleeve measurement, and a similar line $i$ is stamped on the outside of the casing $b$ in close proximity to the end of said casing, which line indicates the starting point of the trouser-leg measurement to be taken.

The operation of the device is as follows: When a sleeve measurement is to be taken, the curved enlargement *c* is placed against the arm-pit, with the link *d* in front, and the casing *b* is extended until the desired length of the sleeve registers with the sleeve line *h* on the outside of the casing, which as shown on the drawings, indicates 18¾ inches. Now if further measurements, such as for instance, a strap measure is to be taken, the tape-line *m* is brought up over the shoulder to the middle of the back, which measurement is then read on the tape-line. When a trouser-leg measurement is to be taken, the curved enlargement *c* is placed against the crotch between the legs, with the link *d* in front, and the casing *b* is extended until the desired length of the trouser-leg registers with the line *i* on the outside of the casing, which as shown on the drawings, indicates 32½ inches. When the trouser-leg measurement is taken, the front end of the curved and concaved enlargement *c* extends somewhat above the inside-seam measurement, or to the bottom of the fly. With the tape line *m* secured to the pivoted link *d* of the enlargement *c*, further measurement to the waist-line is then taken.

A measurement for trouser-legs, which are to be provided with cuffs, is usually one and one-half inches shorter than the measurement taken for trouser-legs without cuffs, and in that case, the extension *g* is swung from its normal position into the dotted line position shown in Fig. 4, in which case, it projects one and one-half inches below the casing *b*, and consequently, when the measurement is read on the rule, the same will be one and one-half inches shorter.

I am aware that changes may be made in the several arrangements of the various parts, as well as in the details of construction thereof, without departing from the scope of my invention; hence I do not wish to be limited to the arrangements and combinations of parts as herein shown and described, as obvious modifications will suggest themselves to those skilled in the art.

I claim:

1. A measuring device, comprising a casing provided on its exterior surface with sleeve-length and trouser-length lines, a slidable member movable with relation to said casing and provided with means whereby said member and casing are frictionally held together in either closed or extended position, said slidable member being provided with graduations on both sides, one side to take sleeve measurements and the other side to take leg measurements, which graduations, in conjunction with the sleeve-length and trouser-length lines, form a basis for measurements, a curved and concaved enlargement formed on the free outer end of said slidable member, the front end of the curved enlargement extending above the rear end thereof and provided with means for securing a tape line thereto.

2. A measuring device, comprising a casing provided on its exterior surface with sleeve-length and trouser-length lines, an extension pivotally arranged on the outside of the casing and in close proximity to the lower end thereof, a graduated member movable with relation to said casing and provided with means formed on the lower end of said member, whereby said member and casing are frictionally held together in either closed or extended position, which graduated member, in conjunction with the sleeve-length and trouser-length lines, form a basis for measurements, a curved and concaved enlargement formed on the free outer end of said graduated member, the front end of the curved enlargement extending above the rear end thereof and provided with means for securing a tape line thereto.

3. A measuring device, comprising a casing provided on its exterior surface with sleeve-length and trouser-length lines, a slidable member provided with sleeve and trouser-length graduations and movable with relation to said casing and with relation to said sleeve and trouser-length lines, whereby said graduations, in conjunction with said sleeve and trouser-length lines, form a basis for measurements, and provided with a flat spring located in a recess formed in the lower end of said slidable member, whereby said member and casing are frictionally held together in either closed or extended position, a curved and concaved enlargement formed on the free outer end of said slidable member, the front end of the curved enlargement extending above the rear end thereof and provided with means for securing a tape line thereto.

This specification signed and witnessed this 30th day of July, 1915.

THEODORE WIDLAND.

Witnesses:
 FREDK. C. FISCHER,
 C. A. ALLISTON.